United States Patent [19]

Mizohata et al.

[11] 4,141,058
[45] Feb. 20, 1979

[54] LIGHT DIFFUSING DEVICE

[75] Inventors: Yukio Mizohata, Kawagoe; Noribumi Tachihara, Tokyo, both of Japan

[73] Assignee: Copal Company Limited, Tokyo, Japan

[21] Appl. No.: 797,731

[22] Filed: May 17, 1977

[30] Foreign Application Priority Data

May 17, 1976 [JP] Japan .................................. 51-56203

[51] Int. Cl.² ........................... F21V 7/04; F21V 5/00; F21V 7/00
[52] U.S. Cl. ..................................... 362/32; 362/328; 362/347; 362/812
[58] Field of Search ................... 362/32, 26, 255, 347, 362/328, 329, 812

[56] References Cited

U.S. PATENT DOCUMENTS

| 3,536,908 | 10/1970 | Oster | 362/32 |
| 3,654,452 | 4/1972 | Frey | 362/32 |
| 3,718,814 | 2/1973 | Van Slyke | 362/32 |
| 3,772,506 | 11/1973 | Junginger | 362/32 |

Primary Examiner—Samuel W. Engle
Assistant Examiner—Donald P. Walsh
Attorney, Agent, or Firm—Cushman, Darby & Cushman

[57] ABSTRACT

A light diffusing device for obtaining a surface uniform in the brightness by using a luminous flux narrow in the radiating angle comprising a flat smooth transparent base plate having a favorable transparency and including a luminous flux incident area defined on one side surface, a conical concavity formed on the other side surface opposed to said one side surface, aligned with the luminous flux incident area and having a bottom area at least equal to said area and light diffusing reflecting means provided on all the side surfaces except the above mentioned other side surface. Said luminous flux incident area is used as a connecting part with the end portion of a light guide or a containing section for a light source. The above mentioned other side surface serves as a displaying surface for such display medium as of words or signs or as a luminous surface for introducing lights of a uniform brightness into a plurality of light guides.

11 Claims, 6 Drawing Figures

LIGHT DIFFUSING DEVICE

BACKGROUND OF THE INVENTION (a) Field of the Invention

The present invention relates to light diffusing devices and more particularly to a light diffusing device of obtaining a surface having a uniform brightness of a comparatively large area by using a luminous flux of a small radiating angle.

(b) Description of the Prior Art

Optical fibers utilized as a light emitting diode or a light guide are so small in the light emitting area or irradiated area and are so narrow in the light radiating angle that it is difficult to uniformly irradiate a surface having a comparatively wide area by using such light source means. However, in the display field, it is required to keep a surface having a predetermined area at a uniform brightness. Various methods have been already attempted to meet this requirement. That is to say, there is suggested a method of widening the radiating angle of a light bundle radiated from the end surface of optical fibers or the surface of a light emitting diode by setting an optical lens adjacently to the luminous end of the optical fibers or the luminous surface of the light emitting diode or by embedding a prism of a special shape formed of such synthetic resin favorable in the transparency as an acrylic resin in the luminous end surface of the optical fibers or the luminous surface of the light emitting diode. However, such conventional method has a defect that the area of the surface which can be kept at a uniform brightness is still so narrow that, in case the area is somawhat wider, the brightness will fluctuate.

SUMMARY OF THE INVENTION

Therefore, a primary object of the present invention is to provide a light diffusing device formed so that, even if a light source means in which the area of the light emitting part is small and the luminous flux radiating angle is narrow is used, a surface having a brightness very high in the uniformity over all the comparatively wide area will be able to be obtained.

Another object of the present invention is to provide a light diffusing device which is simple in the structure and adapted to the mass-production.

Still another object of the present invention is to provide a light diffusing device which can be utilized for such many fields and other indicating devices.

These and other objects of the present invention will become more apparent during the course of the following detailed description and appended claims.

DESCRIPTION OF THE PREFERRED EMBODIMENTS

Figure 1:
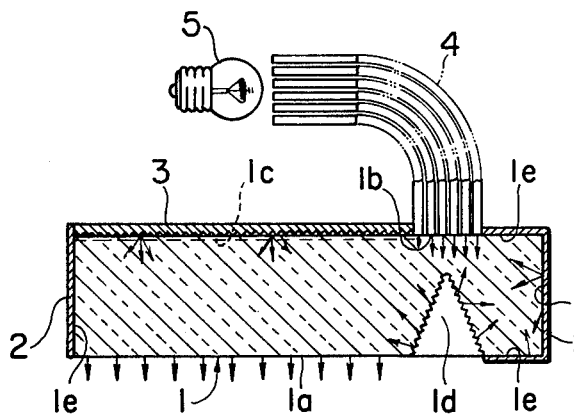
FIG. 1 is a somewhat magnified sectional view on the center line in the lengthwise direction in FIG. 2, showing an embodiment of a light diffusing device according to the present invention.
Figure 2:
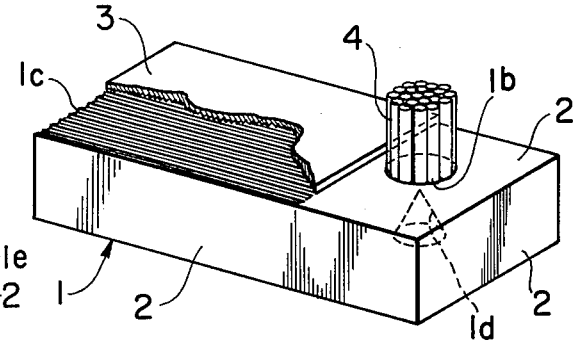
FIG. 2 is a partly sectional perspective view of the light diffusing device shown in FIG. 1.

FIG. 1 shows an embodiment wherein optical fibers are used for the light guide and the shape of the cross-section of the incident luminous flux is circular. With reference to FIGS. 1 and 2, reference numeral 1 represents a rectangular transparent base plate having a proper thickness and made of such substance favorable in the transparency as glass or acrylic resin. One side surface 1a of the transparent base plate 1 is a flat smooth surface (preferably a mirror surface) and has a required area and the greater part of it serves as a used surface having a required uniform brightness. The side surface opposed to the used surface 1a includes a luminous flux incident area 1b and an area 1c treated so that a luminous flux incident upon the interior of the transparent base plate 1 from said area 1b may be diffused toward the used surface 1a as effectively as possible. The area 1c occupies the greater part of the side surface opposed to the used surface 1a and made a rough surface by cutting and providing, for example, many parallel hair-lines as clearly shown in FIG. 2. All the other side surface portions 1e than the above mentioned area 1c of the tansparent base plate 1 are finished as the same flat smooth surfaces (preferably mirror surfaces) as the used surface 1a and are pasted preferably with a mirror surface reflecting sheet 2 made of an aluminum foil or the like as shown in FIG. 1. The area 1c is fitted with a reflecting plate 3 forming a light diffusing reflecting means together with the rough surface. Optical fibers 4 facing a light source lamp 5 on one end surface are in contact on the other end surface with the luminous flux incident area 1b so that the light bundle from the light source lamp 5 may be introduced into the interior of the tansparent base plate 1. A conical concavity 1d having a bottom surface equal to or a little larger than the area of said area 1b is formed on the used surface 1a as aligned with the luminous flux incident area 1b. It is preferable that the depth of this conical concavity 1d or the height of the cone is selected to be substantially equal to the diameter of the bottom surface of the cone. The inside 1d need not particularly be a mirror surface. By forming this conical concavity 1d, the luminous flux narrow in the radiating angle will be once diffused in the peripheral direction within the base plate 1 and therefore the same effect as in the case of inserting the light source lamp into the base plate 1 will be obtained.

According to the light diffusing device according to the present invention formed as mentioned above, the luminous flux from the light source lamp 5 will be led to the luminous flux incident area 1b of the transparent base plate 1 through the optical fibers 4 and will be thence incident upon the interior of the base plate 1 as indicated by the arrows. In such case, the greater part of the incident luminous flux will proceed toward the conical concavity 1d and will be diffused and reflected in the directions indicated by the arrows on the peripheral surface of the conical concavity 1d. A part of the luminous flux having proceeded toward the area 1c will be again diffused and reflected on the area 1c first as indicated by the arrows and will proceed toward the used surface 1a. The part of the luminous flux diffused and reflected in various other directions than of the area 1c will be further reflected by some flat smooth surfaces 1e to expand within the base plate 1. As a result, the entire used surface 1a will have a uniform brightness and will radiate light of a uniform intensity as indicated by the arrows.

Figure 3:
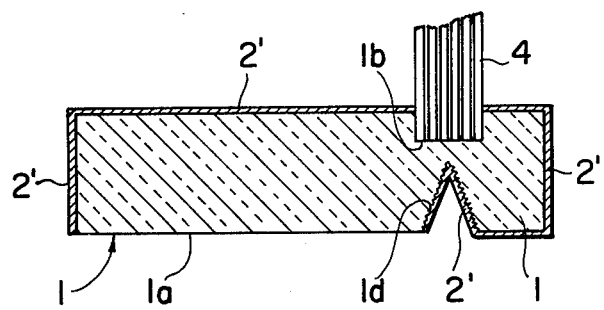
FIG. 3 is the same sectional view as in FIG. 1, showing another embodiment of the light diffusing device according to the present invention.
Figure 4:
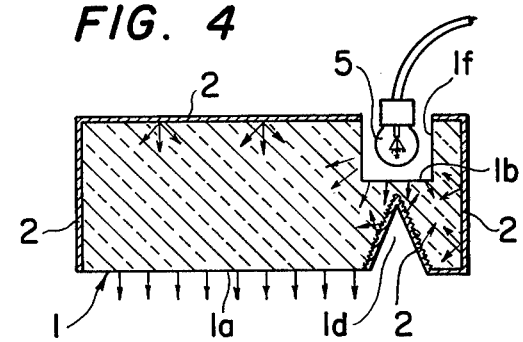
FIG. 4 is the same sectional view as in FIG. 1, showing still another embodiment of the light diffusing device according to the present invention.

In the above mentioned embodiment explained with reference to FIGS. 1 and 2, the luminous flux incident area 1b is circular and is located on the side surface opposed to the used surface 1a, the area 1c is provided with a light diffusing reflecting means consisting of the rough surface and reflecting plate 3 and all the other side surfaces than the used surface 1a, luminous flux incident area 1b and area 1c are covered with a mirror surface reflecting sheet 2. However, as shown in FIGS. 3 and 4, the luminous flux incident area 1b may be formed within the transparent base plate 1 or may be square or rectangular. Therefore, in the embodiment in FIG. 3, the optical fibers 4 are embeded at the end within the base plate 1. Further, in the embodiment in FIG. 4, the base plate 1 is provided with a hole 1f in which the light source lamp 5 is inserted. Instead of the lamp 5, such light source as a light emitting diode can be embedded in this hole 1f. In the case of this system, the area of the luminous flux incident area 1b will be able to be substantially increased. In case the luminous flux incident area 1b is square or rectangular as described above, the concavity 1d will be formed preferably as a pyramid having a bottom surface similar to the area 1b and the same as or larger than the area of the area 1b and its depth or height will be selected to be substantially equal to the length of the diagonal of the bottom surface. Further, depending on the area of the used surface 1a and/or the brightness to be required, instead of making the area 1c a rough surface, using the reflecting plate 3 and covering all the other side surfaces than the luminous flux incident area 1b and used surface 1a with the mirror surface reflecting sheet 2, as shown in FIG. 3, all the above mentioned side surfaces including the inside surface of the conical concavity 1d may be only painted with a light diffusing white paint 2'. Further, it is needless to say that, as shown in FIG. 4, all the required side surfaces may be covered with a mirror surface reflecting sheet 2 instead of the painted film 2'.

Figure 5:
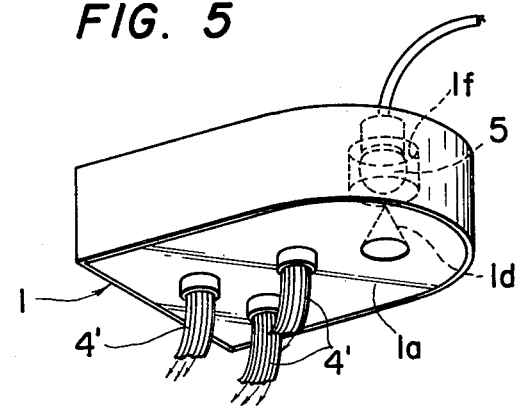
FIG. 5 is a perspective view showing an example of the use of the light diffusing device according to the present invention.
Figure 6:
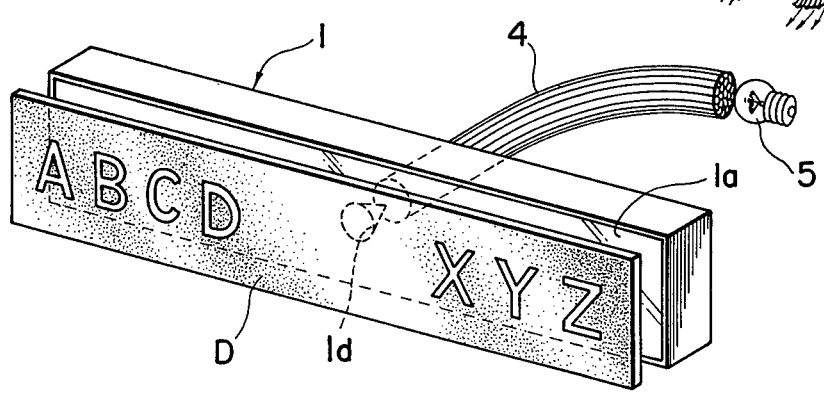
FIG. 6 is a perspective view showing another example of the use of the light diffusing device according to the present invention.

FIGS. 5 and 6 show two respectively different examples of utilizing the light diffusing device according to the present invention. That is to say, FIG. 5 is of an example of utilizing the used surface 1a as a secondary surface light source wherein, by connecting a plurality of groups of optical fibers 4' with the used surface 1a, a plurality of luminous flux of a uniform brightness can be simultaneously obtained. FIG. 6 is of an example wherein a proper display medium D which is preferably a film or the like is set in front of the used surface 1a. In such case, for example, if only the required portions of the display medium D are left transparent, only those portions will be seen in relief with the same brightness.

By the way, as apparent from the above explanation, if respective pluralities of the luminous flux incident area 1b and the conical concavities 1d corresponding to them are provided so that light bundles of respectively different colors may be led respectively onto the luminous flux incident areas and may be selectively fed or interrupted, a polychromatic display will be possible.

An experimental example of the light diffusing device according to the present invention shall be briefly explained in the following:

Five optical fibers of a fiber diameter of 0.5 mm. and length of 1 m. were bundled to be a light guide. An acrylic resin plate of a thickness of 5 mm., length of 20 mm. and width of 12 mm. was used for the transparent base plate 1. The conical concavity 1d was machined to be of a diameter of 3 mm. and height (depth) of 3 mm. The required portion of the side surface opposed to the used surface 1a was coated with a white paint. All the other required side surfaces were formed as mirror surfaces and were pasted with an aluminum foil. A miniature bulb of 6 volts and 0.05 ampere was used for the light source. In such case, a surface of 15 mm. + 15 mm. of a uniform brightness was about 40 ft.—Lambert.

We claim:

1. A light diffusing device comprising a comparatively thick flat smooth transparent base plate having a favorable transparency, a luminous flux incident area defined on the rear side surface of said transparent base plate, a conical concavity formed on the front side surface opposed to said rear side surface of said transparent base plate and aligned with said luminous flux incident area and having a bottom area at least equal to the area of said luminous flux incident area and having a top portion extending toward the interior of said transparent base plate, and a light diffusing reflecting means provided on substantially all the portion except said luminous flux incident area on said rear side surface, whereby, by diffusing and reflecting a luminous flux incident upon said luminous flux incident area within said transparent base plate through said conical concavity and light diffusing reflecting means, the brightness of all said front side surface is kept uniform.

2. A light diffusing device according to claim 1 wherein said light diffusing reflecting means consists of a rough surface and a reflecting plate fitted to said rough surface and all the side surfaces of said transparent base plate except the portion of said rear side surface on which said light diffusing reflecting means is located, said luminous flux incident area and said front side surface are pasted with a mirror surface reflecting sheet.

3. A light diffusing device according to claim 1 wherein all the side surfaces of said transparent base plate except said luminous flux incident area and said front side surface are painted with a light diffusing white paint.

4. A light diffusing device according to claim 1 wherein all the side surfaces of said transparent base plate except said luminous flux incident area and said front side surface are pasted with a mirror surface reflecting sheet.

5. A light diffusing device according to claim 1 wherein said conical concavity is in the form of a cone having a height substantially equal to the diameter of its bottom surface.

6. A light diffusing device according to claim 1 wherein said conical concavity is in the form of a pyramid having a height substantially equal to the length of the diagonal of its square bottom surface.

7. A light diffusing device according to claim 1 wherein optical fibers are connected to said luminous flux incident area.

8. A light diffusing device according to claim 1 wherein said luminous flux incident area is formed within said transparent base plate and the optical fibers are embedded at the end in said transparent base plate to connect said optical fibers to said luminous flux incident area.

9. A light diffusing device according to claim 1 wherein said luminous flux incident area is formed within said transparent base plate and a light source is inserted into said transparent base plate to introduce a luminous flux into said luminous flux incident area.

10. A light diffusing device according to claim 1 wherein a display medium is arranged adjacently to said front side surface.

11. A light diffusing device according to claim 1 wherein a plurality of optical fiber groups are connected to said front side surface.

* * * * *